United States Patent
Hackel et al.

(10) Patent No.: US 6,410,884 B1
(45) Date of Patent: Jun. 25, 2002

(54) CONTOUR FORMING OF METALS BY LASER PEENING

(75) Inventors: Lloyd Hackel, Livermore; Fritz Harris, Rocklin, both of CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/604,781

(22) Filed: Jun. 26, 2000

Related U.S. Application Data

(60) Provisional application No. 60/144,594, filed on Jul. 19, 1999.

(51) Int. Cl.$^7$ ................................................ B23K 26/00
(52) U.S. Cl. .............................. 219/121.85; 219/121.6; 219/121.61
(58) Field of Search ..................... 219/121.6, 121.85, 219/121.61; 148/525, 565

(56) References Cited

U.S. PATENT DOCUMENTS

| | | | |
|---|---|---|---|
| 4,937,421 A | 6/1990 | Ortiz, Jr. et al. ......... 219/121.68 |
| 5,235,838 A | 8/1993 | Berstein et al. ............. 148/510 |
| 5,492,447 A | 2/1996 | Mannava et al. ........... 415/200 |
| 5,522,706 A | 6/1996 | Mannava et al. ........... 416/215 |
| 5,525,429 A | 6/1996 | Mannava et al. ........... 428/610 |
| 5,531,570 A | 7/1996 | Mannava et al. ........... 416/241 |
| 5,569,018 A | 10/1996 | Mannava et al. ........... 415/200 |
| 5,584,586 A | 12/1996 | Casarcia et al. ............ 384/625 |
| 5,584,662 A | 12/1996 | Mannava et al. ....... 416/241 R |
| 5,591,009 A | 1/1997 | Mannava et al. ....... 416/241 R |
| 5,620,307 A | 4/1997 | Mannava et al. ....... 416/241 R |
| 5,671,628 A | 9/1997 | Halila et al. .................... 72/53 |
| 5,674,328 A | 10/1997 | Mannava et al. ........... 148/525 |
| 5,674,329 A | 10/1997 | Mannava et al. ........... 148/525 |
| 5,675,892 A | 10/1997 | Mannava et al. ............. 29/889 |
| 5,730,811 A | 3/1998 | Azad et al. ................. 148/565 |
| 5,735,044 A | 4/1998 | Ferrigno et al. .............. 29/889 |
| 5,741,559 A | 4/1998 | Dulaney ...................... 427/554 |
| 5,742,028 A * | 4/1998 | Mannava et al. ....... 219/121.82 |
| 5,744,781 A | 4/1998 | Yeaton .................. 219/121.84 |
| 5,756,965 A | 5/1998 | Mannava et al. ....... 219/121.85 |
| 5,846,054 A | 12/1998 | Mannava et al. ........ 416/219 R |
| 5,846,057 A | 12/1998 | Ferrigno et al. ......... 416/241 R |
| 5,852,621 A * | 12/1998 | Sandstrom |
| 5,911,890 A | 6/1999 | Dunlaney et al. ...... 219/121.85 |
| 5,911,891 A | 6/1999 | Dulaney et al. ....... 219/121.85 |
| 5,932,120 A | 8/1999 | Mannava et al. ...... 219/121.85 |
| 5,935,464 A | 8/1999 | Dulaney et al. ....... 219/121.65 |
| 5,948,293 A | 9/1999 | Somers et al. ......... 219/121.85 |
| 5,951,790 A | 9/1999 | Mannava et al. ........... 148/510 |
| 5,980,101 A | 11/1999 | Unternahrer et al. ......... 374/32 |
| 5,987,042 A | 11/1999 | Staver et al. .................. 372/30 |
| 5,987,991 A | 11/1999 | Trantow et al. ................ 73/624 |
| 5,988,982 A | 11/1999 | Clauer ..................... 416/241 R |
| 6,002,102 A | 12/1999 | Dulaney et al. ....... 219/121.85 |
| 6,002,706 A | 12/1999 | Staver et al. ................ 372/108 |
| 6,005,219 A | 12/1999 | Rockstroh et al. ..... 219/121.85 |
| 6,021,154 A | 2/2000 | Unternahrer ................ 372/108 |
| 6,049,058 A | 4/2000 | Dulaney et al. ....... 219/121.84 |
| 6,057,003 A * | 5/2000 | Dulaney et al. |

(List continued on next page.)

Primary Examiner—Geoffrey S. Evans
(74) Attorney, Agent, or Firm—John P. Wooldridge; Alan H. Thompson

(57) ABSTRACT

A method and apparatus are provided for forming shapes and contours in metal sections by generating laser induced compressive stress on the surface of the metal workpiece. The laser process can generate deep compressive stresses to shape even thick components without inducing unwanted tensile stress at the metal surface. The precision of the laser-induced stress enables exact prediction and subsequent contouring of parts. A light beam of 10 to 100 J/pulse is imaged to create an energy fluence of 60 to 200 J/cm$^2$ on an absorptive layer applied over a metal surface. A tamping layer of water is flowed over the absorptive layer. The absorption of laser light causes a plasma to form and consequently creates a shock wave that induces a deep residual compressive stress into the metal. The metal responds to this residual stress by bending.

23 Claims, 3 Drawing Sheets

U.S. PATENT DOCUMENTS

| | | | |
|---|---|---|---|
| 6,064,035 A | 5/2000 | Toller et al. | 219/121.86 |
| 6,075,593 A | 6/2000 | Trantow et al. | 356/318 |
| 6,078,022 A | 6/2000 | Dulaney et al. | 219/121.85 |
| 6,127,649 A | 10/2000 | Toller et al. | 219/121.86 |
| 6,130,400 A | 10/2000 | Rockstroh | 219/121.6 |
| 6,144,012 A | 11/2000 | Dulaney et al. | 219/121.85 |
| 6,155,789 A | 12/2000 | Mannava et al. | 416/241 R |
| 6,198,069 B1 * | 3/2001 | Hackel | 219/121.6 |

* cited by examiner

CONTOUR FORMING OF METALS BY LASER PEENING

This application claims priority to Provisional Patent Application Ser. No. 60/144,594, titled "Contour Forming Of Metals By Means of Laser Peening," filed Jul. 19, 1999, incorporated herein by reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to laser shock processing, and more specifically, it relates to techniques for contouring metal by laser peening.

2. Description of Related Art

Using high power lasers to improve material properties is one of the most important industrial applications of lasers. Lasers can transmit controllable beams of high-energy radiation for metalworking. Primarily, the laser can generate a high power density that is localized and controllable over a small area. This allows for cost effective and efficient energy utilization, minimizes distortions in surrounding areas, and simplifies material handling. Since the laser pulse involves the application of high power in short time intervals, the process is adaptable to high-speed manufacturing. The fact that the beam can be controlled allows parts having complex shapes to be processed. Also accuracy, consistency, and repeatability are inherent to the system.

Improving the strength of metals by cold working undoubtedly was discovered early in civilization, as ancient man hammered out his weapons and tools. Since the 1950s, shot peening has been used as a means to improve the fatigue properties of metals. Another method of shock processing involves the use of high explosive materials in contact with the metal surface.

The use of high intensity laser outputs for the generation of mechanical shock waves to treat the surfaces of metals has been well known since the 1970s. The laser shock process can be used to generate compressive stresses in the metal surfaces adding strength and resistance to corrosive failure.

Lasers with pulse outputs of 10 to 100 J and pulse durations of 10 to 100 ns are useful for generating inertially confined plasmas on the surfaces of metals. These plasmas create pressures in the range of 10,000 to 100,000 atmospheres and the resulting shock pressure can exceed the elastic limit of the metal and thus compressively stress a surface layer as deep or deeper than 1 mm in the metals. Lasers are now becoming available with average power output meaningful for use of the technique at a rate appropriate for industrial production.

In the process of laser shock processing, a metal surface to be treated is painted or otherwise made "black" that is, highly absorbing of the laser light. The black layer both acts as an absorber of the laser energy and protects the surface of the part from laser ablation and from melting due to the high temperature of the plasma. A thin layer of water, typically 1 to 2 mm, is flowed over this black surface. The water acts to inertially confine or, as it is called, tamp the plasma generated as the laser energy is absorbed in the short time pulse duration, typically 30 ns. Other suitable materials that act as a tamper are also possible. A limitation to the usefulness of the process is the ability to deliver the laser energy to the metal surface in a spatially uniform beam. If not uniform, the highest intensity area of the light can cause a breakdown in the water which blocks delivery of meaningful energy to the painted metal surface. A conventional technique to deliver the laser light to the surface is to use a simple lens to condense the laser output to a power density of roughly 100 J to 200 J per square centimeter. This condensing technique has the limitation that a true "image" of the laser near-field intensity profile is not obtained at the surface. Rather a field intensity representing something between the near and far fields is generated. Diffraction of the laser beam as it is focused down onto the surface results in very strong spatial modulation and hot spots.

Any phase aberrations generated within the beam, especially those associated with operation of the laser for high average power, can propagate to generate higher intensity areas within the beam. These high peak intensity regions cause breakdown in the water layer, preventing efficient delivery of the laser energy to the surface to be treated. Another potential cause of breakdown in the tamping material is the generation of non-linear effects such as optical breakdown and stimulated scattering. In a normal generation of a 10 ns to 100 ns pulse within a laser, the output slowly builds over a time period exceeding several pulsewidths. This slow, weak intensity helps to seed the non-linear processes that require buildup times of 10s of nanoseconds. In conventional techniques, the pulse output of the laser is "sliced" by an external means such as a fast rising electro-optical switch or by an exploding foil. These techniques can be expensive and can limit reliability.

A controlled application of compressive stress applied to one side of a metal surface will cause that surface to expand in a predictable manner and can thus curve the metal in a highly controllable fashion. Upon curving, the convex surface is left with a residual compressive stress which is highly desirable for fatigue and corrosion resistance of the part in operation. The technique of inducing this compressive stress by means of shot peening is well known and in general use. However, shot peening is limited in the depth of intense compressive stress that can be induced without generating significant and undesirable cold working of the surface layer. Due to the required spherical shape of shot used for peening, the process imparts a non-uniform pressure vs. time profile to the metal during each individual impact of the shot. Pressure is initiated at the first contact point of the sphere and then spreads across the impact area as the metals deform and the entire cross-section of the shot contacts the metal. This non-uniform application of pressure results in a local extrusion of the metal, a flow of metal from the center to the outer area of the impact zone. Consequently, more cold work is done on the metal as material extrudes due to the wedge of pressure created by the impact of the shot.

U.S. Pat. No. 4,694,672, titled "Method And Apparatus For Imparting A Simple Contour To A Workpiece," is directed to a conventional method and apparatus for imparting a simple contour to an aircraft skin. A treatment chamber has a conveyor with a workpiece attached thereto and includes a shot peening blast unit for treatment of the workpiece. A control system is provided for orienting the workpiece and blast unit so that the peening is done only in narrow spanwise strips and only on common chord percentage lines of the workpiece. This method and apparatus thereby creates chordwise simple curvature to the workpiece while minimizing compound curvature effects. See also U.S. Pat. No. 3,668,912.

In U.S. Pat. No. 4,329,862, titled "Shot Peen Forming Of Compound Contours," a flat sheet metal part is conventionally shot peened on both sides. The part is shot peened on one side with an intensity programmed to vary in a pattern for matching the part to a chordwise curvature, and the part takes on the compound curvature of an aircraft wing surface.

It would be desirable if a laser process could achieve an intense stress much deeper into the part and thus effect greater curvature of thicker parts. It would additionally be desirable if the laser process could generate negligible cold work and thus leave a very smooth surface finish.

SUMMARY OF THE INVENTION

It is an object of the present invention to provide a laser peening process that can achieve an intense stress much deeper into the part and thus effect greater curvature of thicker metal sections.

The invention is a method and apparatus for forming shapes and contours in metal sections by generating laser induced compressive stress on the surface of the metal workpiece. The laser process can generate deep compressive stresses to shape even thick components without inducing unwanted tensile stress at the metal surface. The precision of the laser-induced stress enables exact prediction and subsequent contouring of parts.

In the present invention, a light beam of 10 to 100 J/pulse is imaged to create an energy fluence of 60 to 200 $J/cm^2$ on an absorptive layer applied over a metal surface. Typically, water is flowed over the absorptive layer. The absorption of laser light causes a plasma to form and consequently creates a shock wave that induces a deep residual compressive stress into the metal. The metal responds to this residual stress by bending.

It is a well-known concept to use a mechanical means to contour thin metal components. The concept of using a laser to generate shock waves that induce a compressive stress into metals is widely practiced for improving the resistance of metal components to fatigue cracking and corrosion. The present invention applies a laser-induced shock to one side of a metal workpiece to produce a precise local curvature. By applying the shock more generally over a broader area, or multiple times over the same area, larger scale curvatures are achieved. This invention employs a high energy, high average power laser, set to operate at specific parameters to achieve precise shaping of components. This laser peen forming process is especially useful for thick (greater than ¾ inch thick) material that is difficult to shape or contour.

The metal is covered with a layer of material that absorbs the laser light. A thin layer of water is flowed over the absorptive material and illuminated by the laser. By sequentially applying laser pulses in a raster scan fashion, compressive stress is induced over the illuminated surface. The stress will in turn generate a strain of the top layer of metal and produce a curvature to the material. The intensity and depth of compressive stress applied to each local area can be controlled by selecting the laser energy, laser pulse footprint and overlap, the pulse duration and the number of pulses applied to each area. The part can be precisely contoured over its larger area by systematically applying impulses of local stress thereover. Additional control of two-dimensional curvature can be achieved by the specific density in which pulses are placed on the surface that becomes convex, by placing compensating pulses on the surface that becomes concave and by taking advantage of the increasing mechanical moment of inertia generated within the part as a component changes to a curved shape.

The laser peening technique can also be used to precisely straighten components that have an undesired curvature. An important example includes mechanical drive shafts that can acquire an unwanted bend as a result of machining, heat treatment, hardening or other manufacturing processes. By selectively applying compressive stress to the concave side of the unwanted curvature, a part can be systematically straightened.

In contrast to shot peening, the highly uniform laser intensity profile (when using a tailored beam with flat top profile and imaging this profile onto the part) impacts the metal uniformly over the entire impact area resulting in a "blunt" force that causes little extrusion of metal and little cold work. Thus the laser peen forming process can produce a greater volume of stressed metal with little cold work. Relatively large curvatures can be impressed into thick metal sections without severely distorting the metal surface.

BRIEF DESCRIPTION OF THE DRAWINGS

FIG. 6A illustrates the production of a predominately one-dimensional curvature by placing dense rows of doubly peened area on a surface with large spaces between.

DETAILED DESCRIPTION OF THE INVENTION

Techniques for laser peening are disclosed in co-pending U.S. patent application Ser. No. 09/133,590, now U.S. Pat. No. 6,198,069, titled "Laser Beam Temporal And Spatial Tailoring For Laser Shock Processing", incorporated herein by reference. Laser technology usable in the present invention is described in U.S. Pat. No. 5,285,310 titled "High Power Regenerative Laser Amplifier," incorporated herein by reference, and U.S. Pat. No. 5,239,408 titled "High Power, High Beam Quality Regenerative Amplifier," also incorporated herein by reference. Embodiments of laser systems usable in the present invention are described in U.S. Pat. No. 5,689,363 titled "Long Pulse Width, Narrow-Bandwidth Solid State Laser" incorporated herein by reference.

A process for forming shapes and contours in metal sections involves the use of laser induced compressive stress generated on the surface of the metal. The laser process can generate deep compressive stresses which greatly aid in the shaping of thick components without inducing unwanted tensile stress at the metal surface. The precision of the laser induced stress enables exact prediction and subsequent contouring of parts.

Precision forming and shaping of metal components without inducing undesirable tensile stress has important uses in DOD and commercial applications, especially in aircraft and aerospace components. The ability to form thick (¾" to 1" or thicker) metal sections will revolutionize how these thick sections are formed for airplane components such as wing skins. This technique will make it possible to form parts that otherwise could not be formed.

As required, detailed embodiments of the present invention are disclosed herein. However, it is to be understood that the disclosed embodiments are merely exemplary of the present invention that may be embodied in various systems. Therefore, specific details disclosed herein are not to be interpreted as limiting, but rather as a basis for the claims and as a representative basis for teaching one skilled in the art to variously practice the present invention.

It is a well known concept to use a mechanical means, such as a peening hammer or more recently, the technique of shot peening, to contour and shape thin metal components. A compressive stress is "hammered" into the metal and the metal subsequently expands on one side to relieve this stress. The differential expansion causes the metal surface to curve. The concept of using a laser to generate shock waves that induce a compressive stress into metals is well known and becoming fairly widely practiced for improving the resistance of metal components to fatigue cracking and corrosion.

Figure 1A:
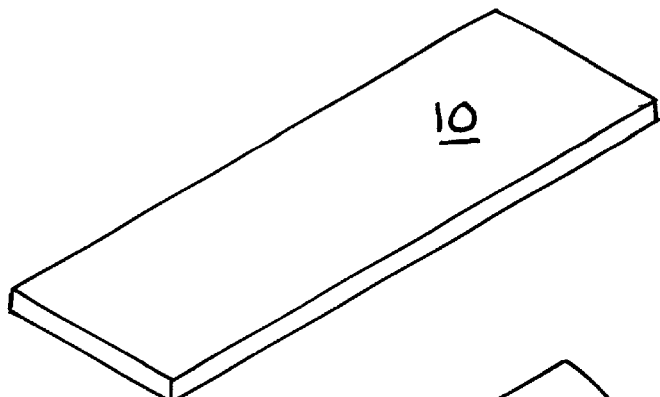
FIG. 1A shows a flat metal plate.
Figure 1B:
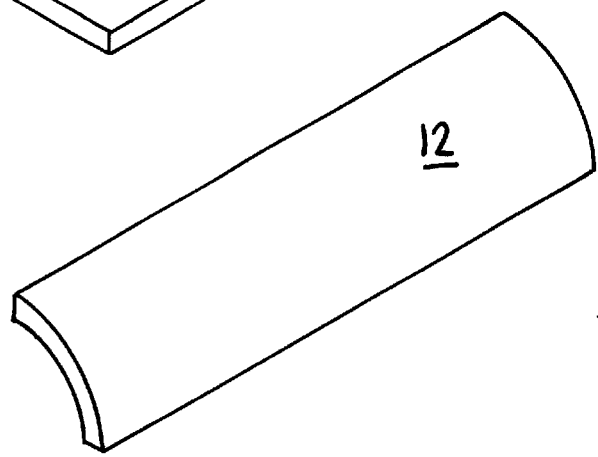
FIG. 1B shows the curvature produced in the metal plate after application of the laser peening process to its top surface.

By appropriately applying the laser induced shock to one side of the metal a precise local curvature can be achieved and by applying the shock more generally over a broader area, larger scale curvature can be achieved. This invention employs a high energy, high average power laser, set to operate at specific parameters to achieve precise shaping of components. This laser peen forming process is especially useful for thick (greater than ¾ inch thick) material that is difficult to shape or contour. FIG. 1A shows a flat metal plate 10. After application of the laser peening process to its top surface 12, the metal plate achieves a desired curvature, as shown in FIG. 1B.

Figure 2:
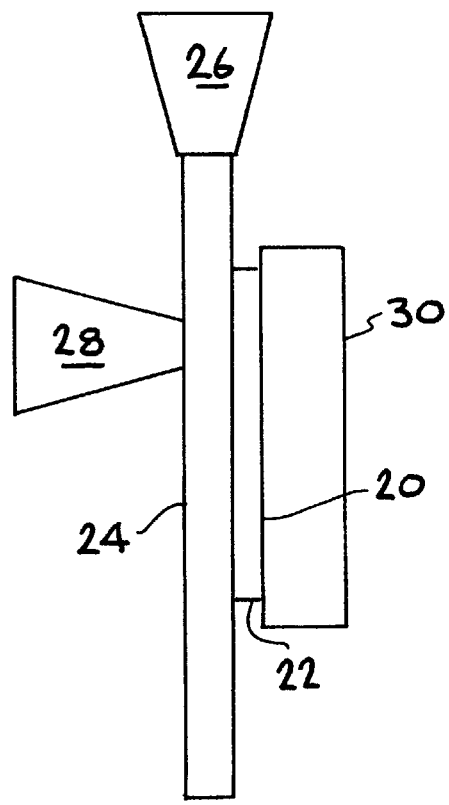
FIG. 2 illustrates the set up of the laser beam and tamping layer with respect to the metal substrate and the absorptive layer.

One embodiment of the present invention, illustrated in FIG. 2, uses a 25 J per pulse laser (25 J to 100 J per pulse is the appropriate range), with a pulse duration of 10 to 20 ns and a rising edge on the pulse of less than 1 ns. The near field is imaged to a spot size (ranging from 6 mm×6 mm to 3 mm×3 mm) giving an energy fluence of between 60 to 200 J/cm$^2$ at the metal surface 20. The metal is covered with a layer of material 22 (typically an polyvinylacetate plastic approximately 200 $\mu$m thick) that absorbs the laser light. A tamping layer, typically a thin layer of water 24 from a flow nozzle 26, approximately 1 mm thick is typically flowed over the absorptive material 22 and is illuminated by the laser beam 28. By sequentially applying laser pulses in a raster scan fashion, compressive stress will be induced over the surface illuminated. The laser beam 28 or the metal component 30 can be moved to achieve the rastered pattern. The stress will in turn generate a strain on the top layer of metal 30 and produce a curvature to the material. The intensity and depth of compressive stress applied to each local area can be controlled by selecting the laser energy, laser pulse footprint and overlap, the pulse duration and the number of pulses applied to each area. Two-dimensional curvature can be achieved by selectively controlling the area peened and the intensity and number of pulses used in each coordinate direction. Additionally, deformation in any desired direction can be enhanced by mechanically inducing a bending moment (although below the yield limit of the metal) in that direction during application of the laser peenforming pulses.

Figure 3A:
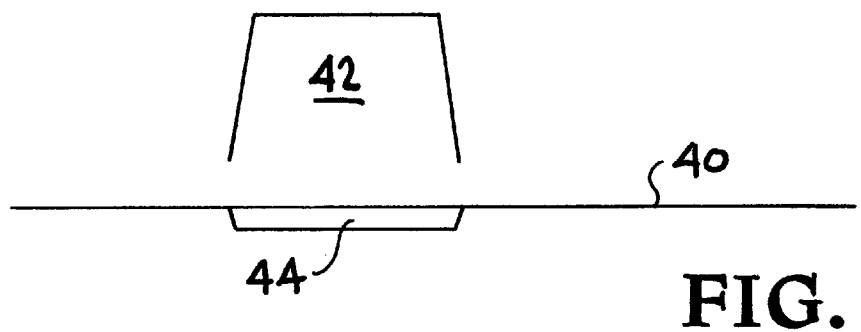
FIG. 3A shows the "top hat" intensity profile of an individual pulse directed onto a metal surface and the strain and corresponding stress pattern produced in the metal after peening.
Figure 3B:
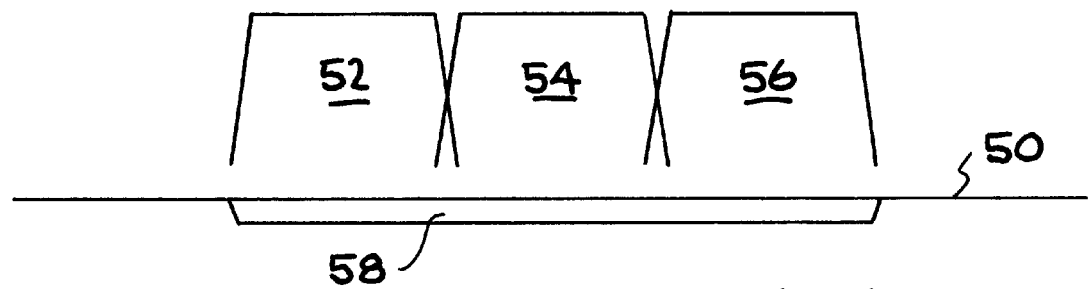
FIG. 3B shows the "top hat" intensity profile of multiple rastered pulses precisely spaced to produce uniform peening strain and the uniform strain and corresponding stress pattern in the metal after peening with the rastered beam.

Because the locally applied stress will directly effect the local curvature, the part can be precisely contoured over its larger area by systematically applying impulses of local stress over the large area. FIG. 3A shows a metal surface 40, the "top hat" intensity profile 42 of an individual pulse directed onto metal surface 40 and the strain and corresponding stress pattern 44 in the metal after peening. FIG. 3B shows a metal surface 50 and the "top hat" intensity profile of multiple rastered pulses 52, 54 and 56 precisely spaced to produce uniform peening strain. The figure shows the uniform strain and corresponding stress pattern 58 in the metal after peening with the rastered beam. Precision overlap of multiple pulse profiles combined with the rectangular profile of the laser beam and the top hat uniform intensity profile produces a smooth surface finish after peenforming.

Figure 4:
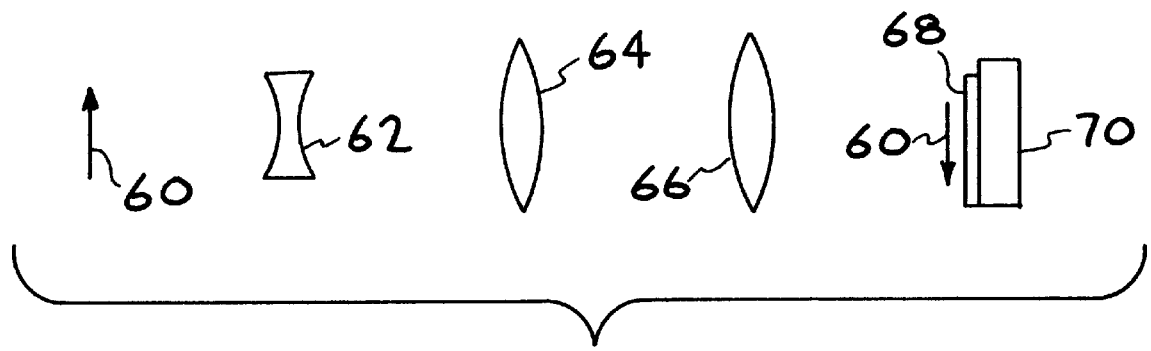
FIG. 4 shows the means for imaging the laser near field onto the absorptive layer on a metal surface.

FIG. 4 shows an optical set up that can be used to image the near field onto the ablative layer. The near filed 60 is expanded in negative lens 62, is collimated by first positive lens 64 and is imaged with positive lens 66 onto the ablative layer 68 on metal piece 70. The imaging of the near field of the laser beam onto the absorptive layer produces a uniform intensity profile and prevents phase distortion from producing intensity hot spots.

Figure 5:
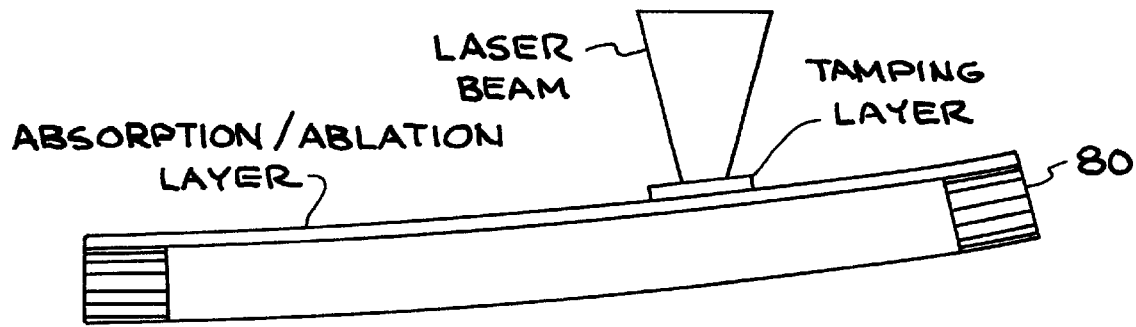
FIG. 5 illustrates the removal of unwanted curvature in a drive shaft by laser peening.

In an analogous way to achieving desired shapes in nominally flat metal, the laser peening technique can be used to precisely straighten components with an undesired curvature. An important example includes mechanical drive shafts that can acquire an unwanted bend as a result of machining, heat treatment, hardening or other manufacturing processes. By selectively applying compressive stress to the concave side of the unwanted curvature, a part can be systematically straightened. Referring to FIG. 5, an unwanted curvature in drive shaft 80 is removed by peenforming on the short side of the drive shaft. The drive shaft 80 is provided with an absorption/ablation layer 82 and a tamping layer 84. A laser beam 86 is applied to the short side of the shaft and the shaft straightens as multiple pulses are applied.

Figure 6A:
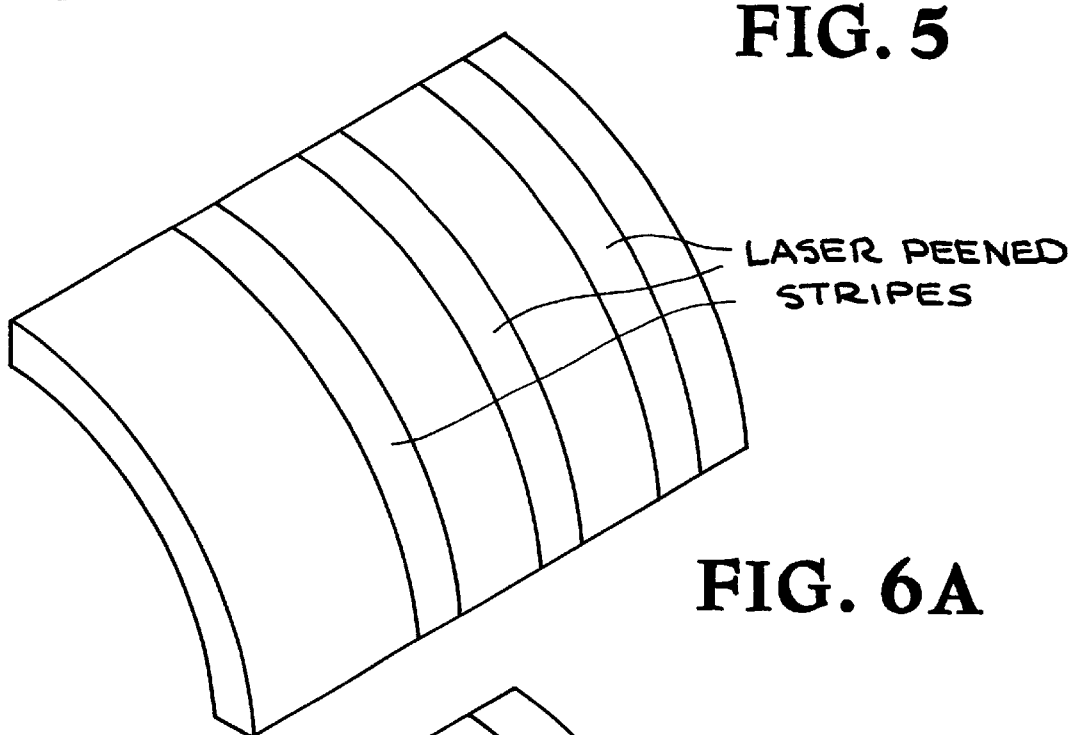
Figure 6B:
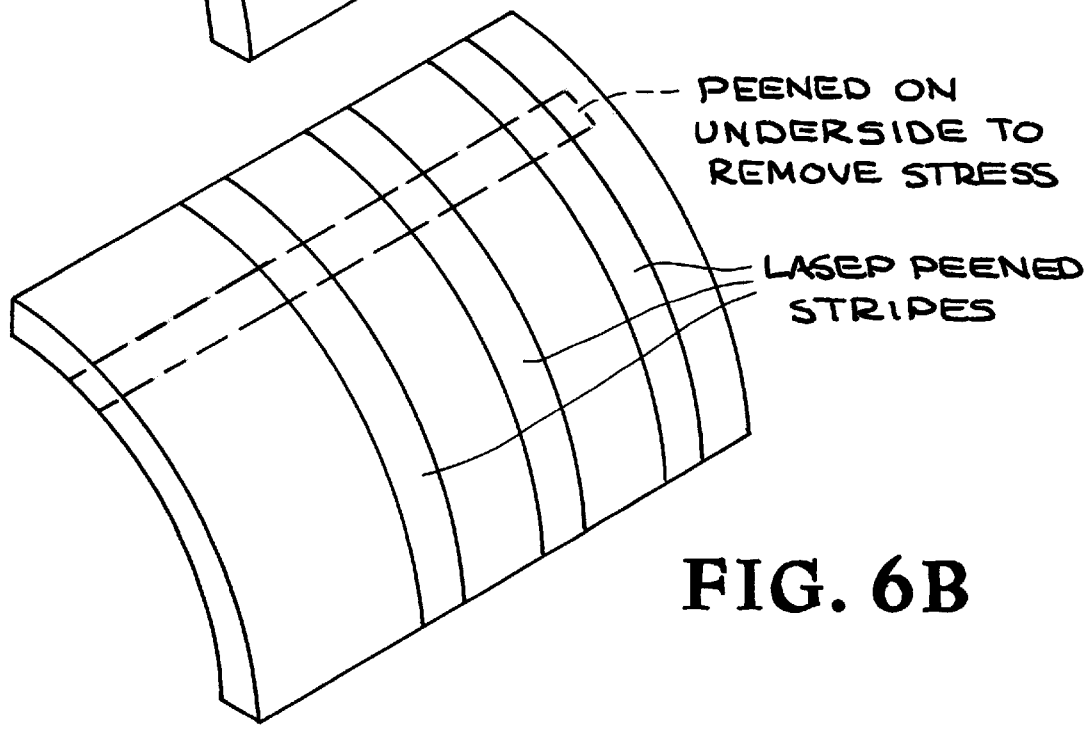
FIG. 6B shows a panel such as shown in FIG. 6A that is further straightened in the y dimension by peening densely along the orthogonal y-dimension on the back or concave side of the curved section.

In FIG. 6A, a predominately one-dimensional curvature is achieved by placing dense rows of doubly peened area on a surface with large spaces between. The one-dimensional nature of the peening results in a one-dimensional curvature. In FIG. 6B, a panel such as shown in FIG. 6A is further straightened in the y dimension by peening densely along the orthogonal y-dimension on the back or concave side of the curved section. Finally it is recognized that the mechanical moment of inertia or stiffness about the axis containing the curvature (x-axis in our example) increases as the part curves. By applying the two techniques discussed above, the increased moment of inertia aids in creating the preference for one-dimensional curvature. The initial peening pattern is applied symmetrically and uniformly to the part so that the curvature and moments of inertia develop in a symmetric way.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method for forming shapes and contours in metal, comprising:
   providing a metal workpiece to be formed;
   generating laser induced compressive stress on a surface of said metal workpiece until a desired shape is formed therein; and
   enhancing the amount of a bend produced in said metal workpiece by utilizing a mechanical bending moment during the peening process.

2. The method of claim 1, wherein the step of generating laser induced compressive stress further comprises selecting laser energy, laser pulse footprint, laser pulse overlap, pulse duration and number of pulses applied to each area of said metal workpiece to control intensity and depth of compressive stress applied to said each local area of said metal workpiece.

3. The method of claim 2, wherein the step of selecting the laser energy comprises selecting a laser energy within a range of 10 J to 100 J per pulse.

4. The method of claim 2, wherein the step of selecting the pulse duration comprises selecting a pulse duration within a range of 10 ns to 20 ns.

5. The method of claim 4, wherein said pulse comprises a rising edge of less than 1 ns.

6. The method of claim 1, wherein the step of generating laser induced compressive stress comprises covering said workpiece with a layer of material that absorbs laser light.

7. The method of claim 2, further comprising imaging the near field of said laser to a spot size on said metal workpiece.

8. The method of claim 2, further comprising imaging the near field of said laser to a spot size to provide an energy fluence of between 60 and 200 J/cm$^2$ at the surface of said metal workpiece.

9. The method of claim 6, wherein said material comprises plastic.

10. The method of claim 9, wherein said plastic is selected from a group consisting of polyvinyl acetate plastic and polyvinyl chloride plastic.

11. The method of claim 10, wherein said plastic is approximately 200 μm thick.

12. The method of claim 6, wherein the step of generating laser induced compressive stress further comprises flowing a thin layer of water over said material, wherein said thin layer of water acts as a tamping layer.

13. The method of claim 12, wherein said thin layer of water is approximately 1 mm thick.

14. The method of claim 1, wherein the step of generating laser induced compressive stress comprises sequentially applying laser pulses in a raster scan fashion on a surface of said metal workpiece, wherein compressive stress will be induced over said surface, wherein said compressive stress will in turn generate a strain of the top layer of said metal workpiece and produce a curvature in said metal workpiece.

15. The method of claim 1, wherein the step of generating laser induced compressive stress comprises selectively applying compressive stress to the concave side of a metal workpiece having an unwanted curvature to systematically straighten a part.

16. The method of claim 1, wherein the step of generating laser induced compressive stress includes generating laser induced compressive stress on a surface of said metal workpiece until a desired shape is formed therein without inducing unwanted tensile stress at the surface of said metal workpiece.

17. The method of claim 1, further comprising controlling peenforming in two dimensions by selectively applying pulses to a two-dimensional area, controlling the number of pulses applied at each spot and the intensity of each pulse.

18. The method of claim 1, further comprising controlling peenforming in two dimensions by selectively applying pulses to a two-dimensional area, controlling the number of pulses applied at each spot and the intensity of each pulse, by placing compensating pulses on the surface that becomes concave and by taking advantage of the increasing mechanical moment of inertia generated within the part as a component changes to a curved shape.

19. An apparatus for forming shapes and contours in a metal workpiece, comprising:
   a laser system that is capable of producing a series of laser pulses, wherein each laser pulse of said series of laser pulses has an energy within a range of 10 J to 100 J per pulse, wherein said each laser pulse has a pulse duration within a range of 10 ns to 20 ns and a rising edge that is less than 1 ns;
   a layer of material that absorbs light fixedly attached to a metal workpiece, wherein said material comprises plastic, wherein said plastic comprises polyvinyl acetate or polyvinyl chloride plastic;
   a thin layer of water flowing over said layer of material; and
   means for imaging the near field of said each laser pulse to a spot size on said layer of material, wherein said series of laser pulses will generate compressive stress on the surface of said metal workpiece until a desired shape is formed therein without inducing unwanted tensile stress at the surface of said metal workpiece.

20. The apparatus of claim 19, wherein said means for imaging the near field of said each laser pulse images said each laser pulse to a spot size to provide an energy fluence of between 60 and 200 J/cm$^2$ at the surface of said metal workpiece.

21. The apparatus of claim 19, wherein said plastic is approximately 200 μm thick.

22. The apparatus of claim 19, wherein said thin layer of water is approximately 1 mm thick.

23. The apparatus of claim 19, further comprising means for sequentially applying laser pulses in a raster scan fashion on the surface of said metal workpiece, wherein compressive stress will be induced over the surface illuminated, wherein said compressive stress will in turn generate a strain of the top layer of said metal workpiece and produce a curvature in said metal workpiece.

* * * * *